United States Patent
Clemmer, Jr.

(10) Patent No.: US 6,840,643 B2
(45) Date of Patent: Jan. 11, 2005

(54) LAW OFFICER'S INVESTIGATION SAFETY MIRROR

(76) Inventor: Gordon W. Clemmer, Jr., 1389 Ramsgate Dr., Corona, CA (US) 92881

( * ) Notice: Subject to any disclaimer, the term of this patent is extended or adjusted under 35 U.S.C. 154(b) by 96 days.

(21) Appl. No.: 10/318,733

(22) Filed: Dec. 13, 2002

(65) Prior Publication Data

US 2003/0112535 A1 Jun. 19, 2003

Related U.S. Application Data

(60) Provisional application No. 60/339,982, filed on Dec. 17, 2001, and provisional application No. 60/347,328, filed on Jan. 16, 2002.

(51) Int. Cl.$^7$ .............................................. G02B 7/182
(52) U.S. Cl. ........................ 359/875; 359/882; 362/139
(58) Field of Search ................................ 359/367, 871, 359/872, 875, 882; 362/109, 135, 138, 139, 142

(56) References Cited

U.S. PATENT DOCUMENTS

| | | | |
|---|---|---|---|
| 998,021 A | 7/1911 | Marcy | |
| 1,029,420 A | 6/1912 | Buzby | |
| 1,036,000 A | 8/1912 | Pease | |
| 1,817,417 A | * 8/1931 | Meitzler | 600/248 |
| 2,137,881 A | * 11/1938 | Margulies | 362/202 |
| 2,235,109 A | 3/1941 | Morey | |
| 2,544,859 A | 3/1951 | Quam | |
| 2,740,882 A | 4/1956 | Soucy | |
| 4,349,246 A | 9/1982 | Binner | |
| 4,521,834 A | 6/1985 | Orr | |
| 4,856,888 A | 8/1989 | Wahl | |
| 5,076,701 A | 12/1991 | Greenlaw | |
| 5,386,322 A | 1/1995 | Parsons | |
| D359,744 S | 6/1995 | Peavey et al. | |
| 5,428,484 A | 6/1995 | Baker | |
| 5,450,298 A | * 9/1995 | Fells et al. | 362/139 |
| D369,082 S | 4/1996 | Fells et al. | |
| 5,636,918 A | * 6/1997 | Lott | 362/139 |
| 5,915,825 A | * 6/1999 | Weister | 362/139 |
| 6,193,386 B1 | * 2/2001 | Reynolds | 362/109 |

* cited by examiner

Primary Examiner—Mark A. Robinson
(74) Attorney, Agent, or Firm—Christie, Parker & Hale, LLP (57) ABSTRACT

A mirror accessory is connectible by a police officer, e.g., to the lens end of a flashlight to enable viewing around corners, into rooms and other places without exposing the officer to hazard. The accessory includes a coupling ring engagable to the end of a flashlight and a mirror assembly connected to the ring by a hinge having plural detented stable positions. The mirror assembly also is movable about a swivel axis which is perpendicular to the hinge axis and is movable about the hinge axis. The mirror assembly has plural detented stable positions angularly about the swivel axis.

18 Claims, 9 Drawing Sheets

LAW OFFICER'S INVESTIGATION SAFETY MIRROR

CROSS-REFERENCE TO RELATED APPLICATION

This application claims the priorities of U.S. provisional patent application No. 60/339,982 filed Dec. 17, 2001 and No. 60/347,328 filed Jan. 16, 2002.

FIELD OF THE INVENTION

This invention pertains to a mirror assembly which can be attached by a police officer, e.g., to the end of a flashlight, e.g., to enable the officer to safely see under, around or over objects.

BACKGROUND OF THE INVENTION

A police officer can encounter on-the-job situations where the ability to indirectly, as by-use of a mirror, see around a corner without exposing any part of the officer's body can be life saving. For example, in the pursuit of a possibly-armed suspected perpetrator of a crime, a police officer may conduct a search in or around a building. Conduct whereby the officer peeks around a corner or into a room may cause injury to the officer by the suspect. It would be better for the officer to use a mirror, supported by something other than the officer's hand, to obtain a view around the corner or into the room. The thing used to support the mirror preferably is an article the officer normally has or carries as an item of regular equipment; a flashlight is such an article. The mirror should be easily carried by the officer when the mirror is not in use. The mirror should be easily mountable to a flashlight, e.g.

SUMMARY OF THE INVENTION

This invention addresses the need, described above, for a mirror accessory conveniently usable by a police officer in combination with a flashlight to obtain visual access around corners and into rooms without exposure of the officer's body to hazards which may be around the corner or in the room. The mirror accessory folds to a compact state for convenient carriage by the officer when not in use. The mirror opens to a state in which a coupling ring can be swiftly engaged with the front end of a flashlight. When the accessory is engaged with and supported by a flashlight, the position of the mirror relative to the flashlight body can be adjusted to one of several stable positions.

Generally speaking, and according to one of its aspects, the invention provides a mirror accessory for a flashlight having a lens end. The accessory includes a mounting member sized and configured for snug removable engagement around at least a portion of the exterior circumference of the lens end of a flashlight of selected design. A mirror member includes a mirror surface. The accessory also includes a hinge structure connected between the mounting and mirror members and defined to afford movement of the mirror member relative to the mounting member between a storage position in which the members are in overlying relation and a usage position angularly displaced from the storage relation by an angle of at least 135°.

According to another of its aspects, the mirror accessory for the lens end of a flashlight includes a mounting member configured for removable stable engagement with the exterior of the lens end of a flashlight of selected design, and a mirror member which has a mirror surface. The accessory also includes a hinge structure connected between the mounting and mirror members. The hinge structure has first and second leaves which are connected for angular movement about a hinge axis. The first leaf is affixed to the mounting member. The second leaf defines a swivel axis perpendicular to the hinge axis. The mirror member is connected to the second leaf for angular movement about the swivel axis.

DESCRIPTION OF THE DRAWINGS

The above-mentioned and other features and benefits of the invention are more fully set forth in the following description of a presently preferred embodiment of the invention presented with reference to the accompanying drawings, wherein.

DESCRIPTION OF THE ILLUSTRATED EMBODIMENT

Figure 1:
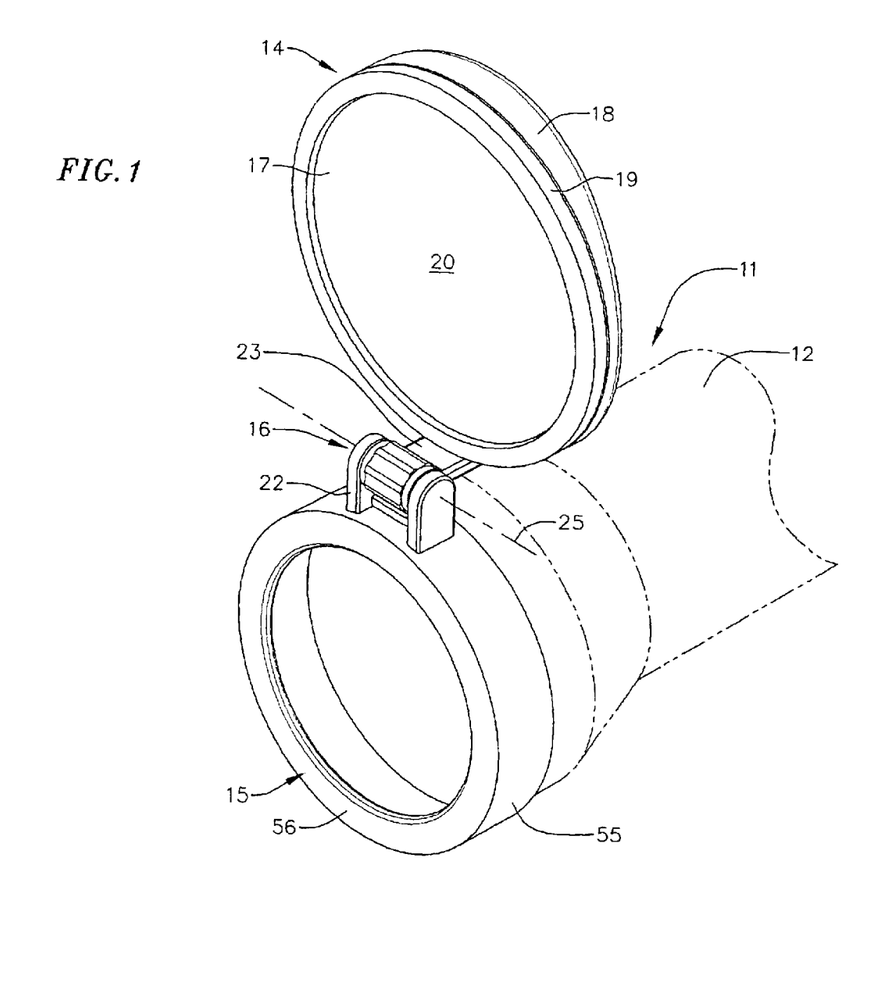
FIG. 1 is a perspective view of a presently preferred mirror accessory as opened and coupled for support to the front end of a flashlight.

A flashlight mirror accessory 10 is shown in an open state in FIG. 1 attached to the front or lens end of a flashlight 11 having a body 12. The accessory is shown in its preferred closed or storage state in FIGS. 2 and 3. The accessory is comprised generally by a mirror assembly 14, a coupling ring 15, and a hinge mechanism 16 which movably interconnects the mirror assembly and the coupling ring. The mirror assembly is comprised by a reflective mirror element 17, a mirror housing 18, and an annular frame 19. The frame secures the mirror element in the mirror housing with a mirror surface 20 of the element visible in the open center of the frame. The hinge mechanism 16 is comprised generally by a hinge base member 22, preferably held captive in the coupling ring 15 and by a hinge post 23 movably held captive in the mirror assembly.

Figure 8:
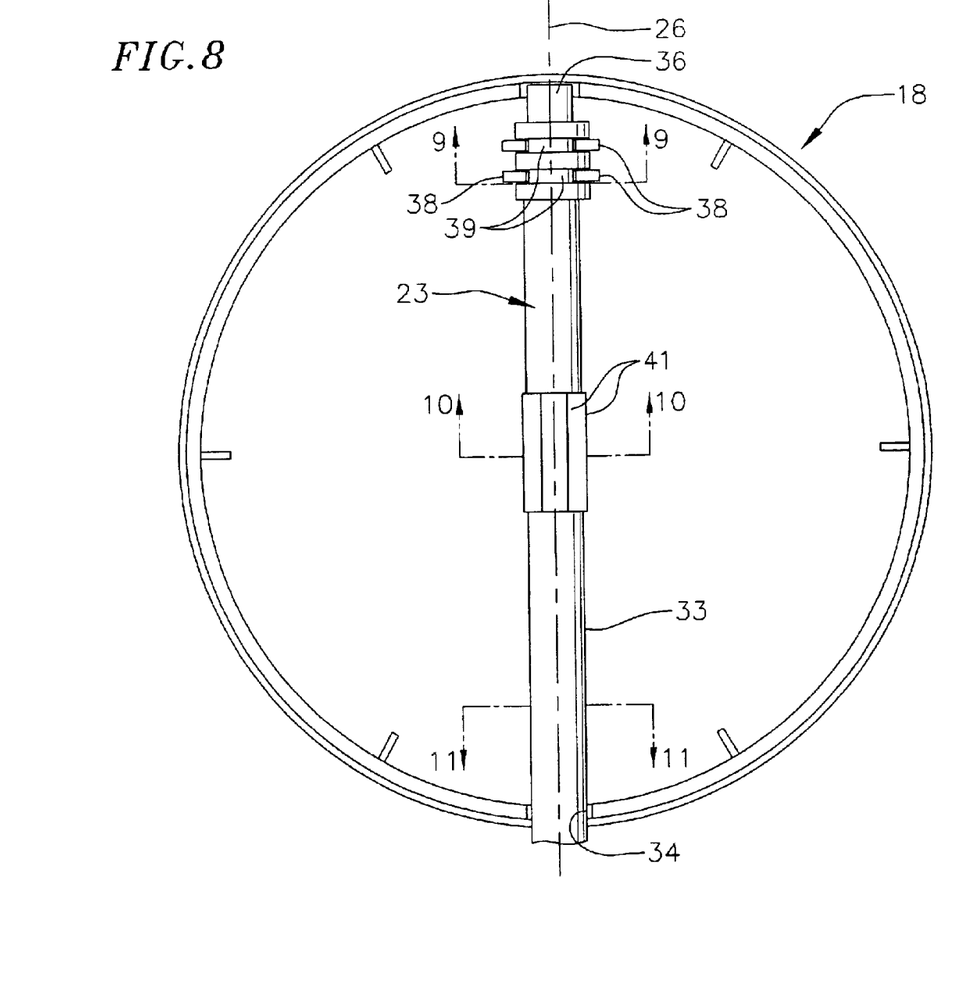
FIG. 8 shows the cooperation of a hinge post member with features of the mirror housing.
Figure 9:
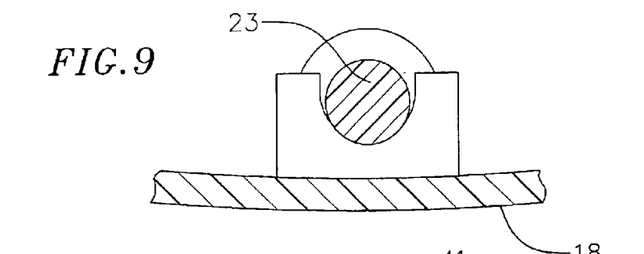
FIG. 9 is a view taken along lines 9—9 in FIG. 8.

Hinge mechanism 16 is defined to enable the mirror assembly 14 to be moved relative to coupling ring 15 about a hinge axis 25 which is radially outwardly displaced from the exterior of the ring and is perpendicular to the ring's axial centerline about which the ring is substantially symmetrical. The hinge mechanism also cooperates with the mirror assembly to define a swivel axis 26 (see FIG. 8) about which the mirror assembly can be turned. The swivel axis 26 preferably is disposed diametrically through the mirror assembly which, as shown in FIG. 1, can be of generally flat, preferably circular construction. Swivel axis 26 is perpendicular to and preferably is laterally displaced from hinge axis 25. Axes 25 and 26 are disposed so that when the accessory is in its closed state shown in FIG. 3, the swivel axis is parallel to a diameter of coupling ring 15 through the center of hinge mechanism 16 as depicted in that FIG. Because the swivel axis is defined by one of the two leaves of hinge 16, the swivel axis is movable relative to mounting ring 15.

Figure 7:
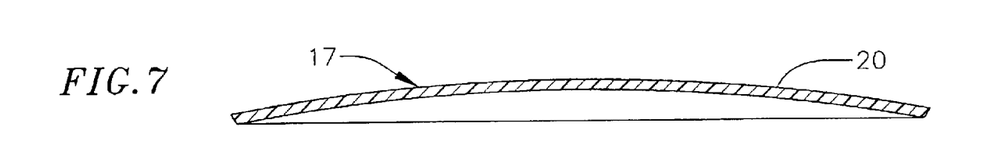
FIG. 7 is a cross-sectional elevation view of the mirror element.

While the mirror element can define a flat mirror surface, it is preferred that the mirror element define a spherically curved convex mirror surface 20; see FIG. 7. The mirror surface is the surface toward which a user looks during use of the accessory.

Mirror housing 18 preferably is circular in planform configuration and can have cylindrically curved outer and inner major surfaces. A housing inner surface 28 is surrounded by a cylindrical rim 29 via which the housing mates with frame 19 to hold the mirror element in fixed relation to the housing; see FIG. 12. The upper inner margin of the housing rim preferably is recessed, as at 30, around the circumference of the housing, and the outer lower margin of the frame preferably is recessed, as at 31, circumferentially of the frame, so that the lower inner margin of the frame is matable in housing recess 30, as shown in FIG. 12.

Figure 5:
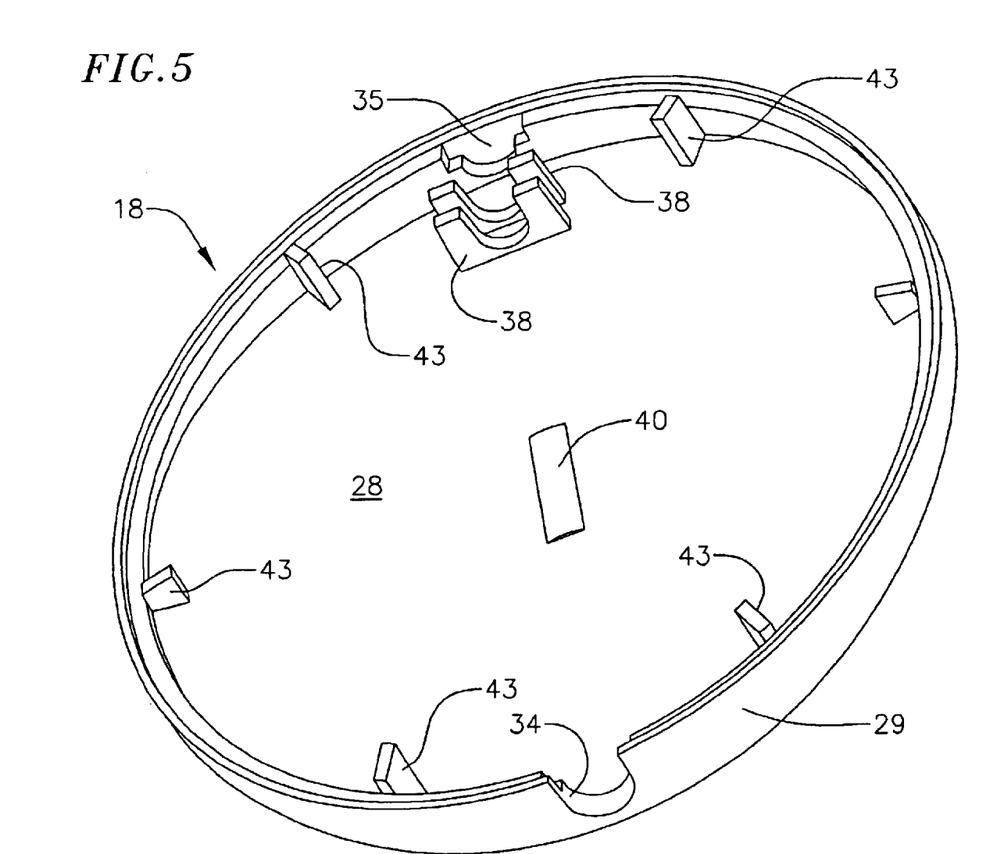
FIG. 5 is a perspective view of the interior of a mirror housing of the mirror accessory.
Figure 6:
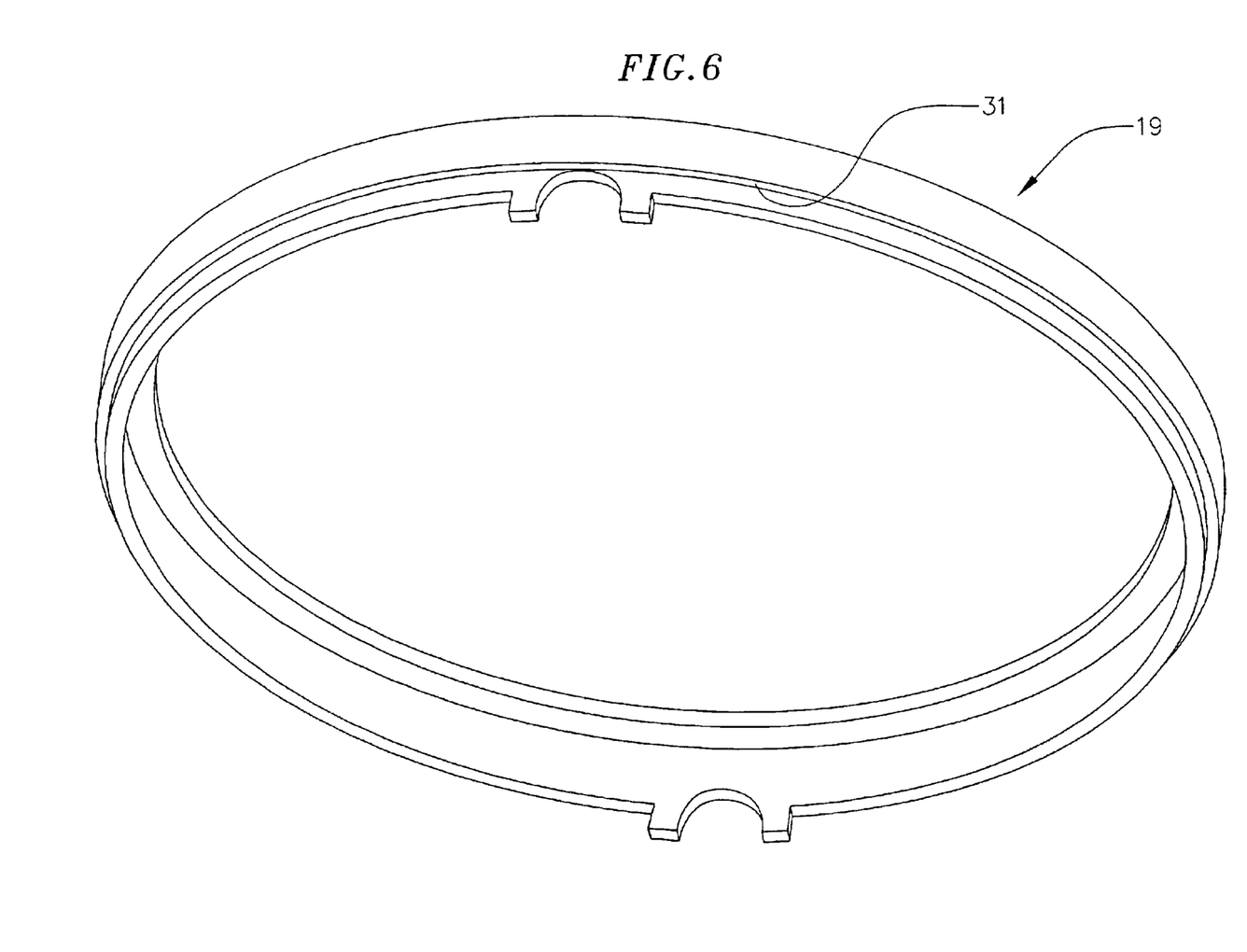
FIG. 6 is a perspective view of a frame useful to retain a mirror element in the mirror housing.

To permit a round rod-like post shaft 33 of hinge post member 23 to extend into and across the interior of housing 18, a port 34, preferably having a semicircularly curved bottom surface, is formed through housing rim 29 as shown in FIG. 5. At a location on the housing which is diametrically opposite port 34, the inner wall of rim 29 is recessed at 35; recess 35 preferably has a semicircularly curved bottom. The width of port 34 is slightly larger than the diameter of post shaft 33. The width of recess 35 is slightly greater than the diameter of a reduced diameter end portion 36 of the post shaft. Closely adjacent to its end portion 36, at least one, and preferably two, keyway grooves 37 are formed circumferentially about the post shaft. Key ribs 38 are raised from the housing inner surface and cooperate in the keyway grooves. That is, the post shaft extends through port 34 to the opposite side of housing 18 where the shaft end portion 36 is received in recess 35, the key ribs 38 cooperating in keyway grooves 37 to hold the shaft against axial movement relative to the housing while enabling the shaft to rotate relative to the housing. Connection of frame 19 to housing 18 secures shaft 33 in port 34 and in housing recess 35. The axis of shaft 33 is swivel axis 26.

Figure 10:
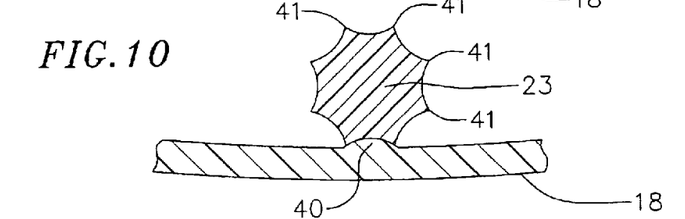
FIG. 10 is a view taken along line 10—10 in FIG. 8.
Figure 11:
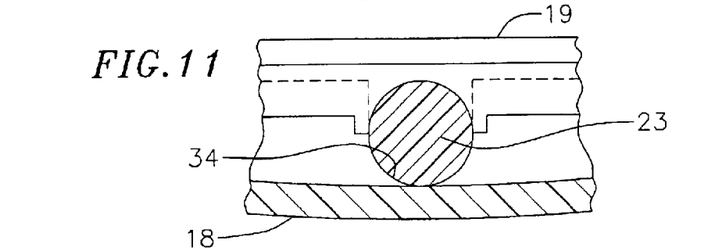
FIG. 11 is a view taken along line 11—11 in FIG. 8.

An elongate, circularly cylindrically curved detent projection 40 can be defined on the inner surface of housing 18 for cooperation with a plurality of detent ribs 41 formed along post shaft 33 at about the middle of the extent of shaft 33 between port 34 and recess 35; see FIGS. 5, 7, 10 and 15. Ribs 41 are parallel to the length of shaft 33. Preferably there are eight ribs uniformly spaced around the exterior of shaft 33. The contour of the shaft between the peaks of ribs 41 can be a negative of the contour of housing rib 40. The ribs 40 and 41 cooperate with each other as shown in FIG. 10 to provide a detenting action on rotation of shaft 33 in the housing. The positions of ribs 41 on shaft 33 are selected so that the housing can be turned on the shaft to occupy any one of eight stable positions on the shaft. Those positions are 45° from each other, and in two of them the diameter of the mirror assembly transversly of shaft 33 is parallel to hinge axis 25.

Figure 12:
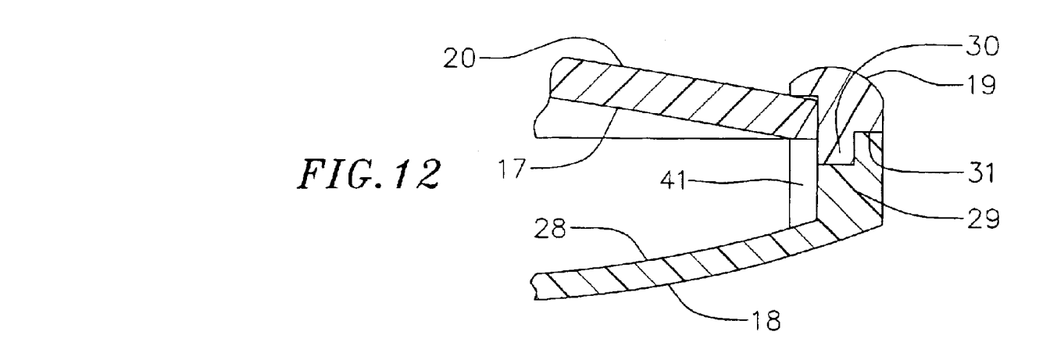
FIG. 12 is a fragmentary cross-section view of the perimeters of the mirror housing, mirror element and mirror frame as assembled together.

As shown in FIGS. 5 and 12, positioning posts 43 are raised from the inner surface of housing 18 adjacent the housing rim at selected locations around the housing. The upper ends of the positioning posts can be sloped to mate with the preferably concave inner surface of the mirror element as mounted to the housing by frame 19. See FIG. 12.

Figure 13:
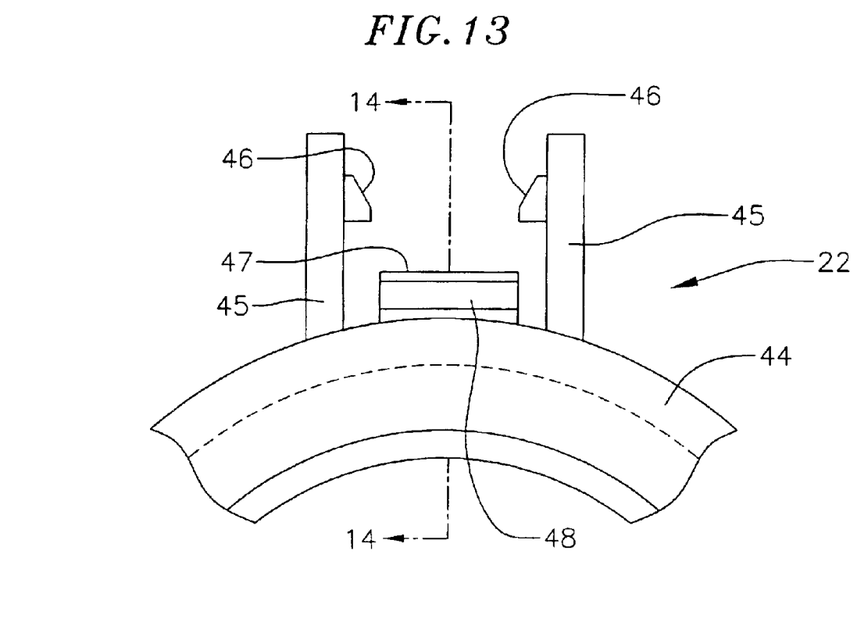
FIG. 13 is an elevation view of a base member for the hinged connection between the mirror and its coupling ring.
Figure 14:
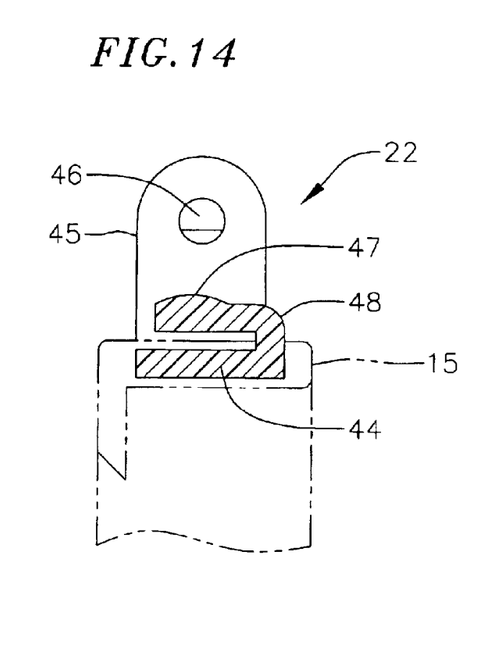
FIG. 14 is a view taken along line 14—14 in FIG. 13 and shows the coupling ring cross-section in broken lines.
Figure 15:
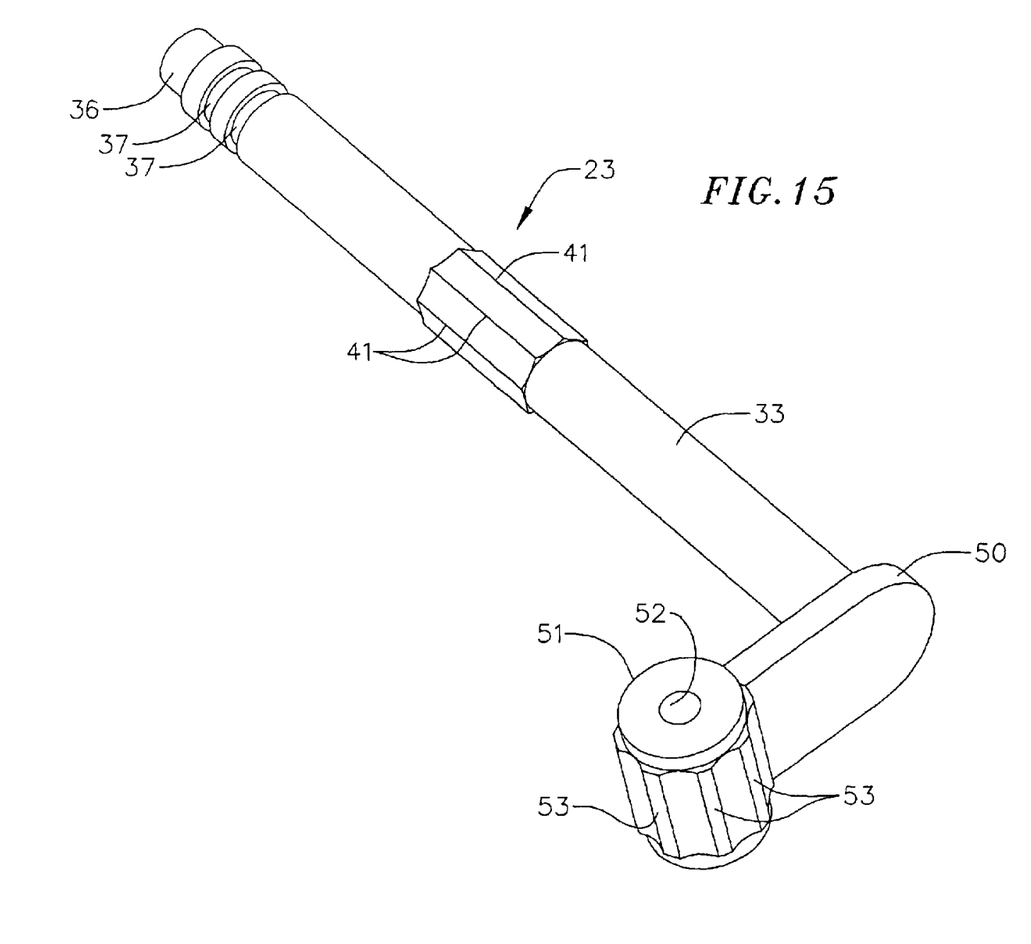
FIG. 15 is a perspective view of the hinge post member.

FIGS. 13–15 show details of the components of hinge mechanism 16. One leaf of that hinge mechanism is formed by hinge base 22. Post shaft 33 is, in effect, a part of the other leaf of that hinge. Hinge base 22 includes an elongate, arcuately curved strip-like element 44 which serves as a foundation in base 22. The curvature of element 44 is defined so that it can be embedded in and encapsulated by the material of coupling ring 15. A pair of spaced and parallel arms 45 extend from the convex surface of element 44, at about the midlength of the element. The widths of arms 45 (see FIG. 14) are transverse to the length of element 44. Adjacent the free ends of the arms, a pair of coaxially aligned stub shafts 46 extend from the opposing faces of the arms. The stub shafts are spaced above a detent projection 47 carried on hinge base 22 between arms 45. Projection 47 preferably has a surface formed as a portion of a cylinder having its axis parallel to the common axis of the stub shafts. Projection 47 preferably is carried on a finger 48 which can be formed integral with element 44 and which can extend up from an edge margin of element 44 between arms 45 and then parallel to the element. In that way, projection 47 is resiliently carried on the hinge base.

Hinge post 23, as noted, preferably includes post shaft 33. The end of shaft 33 outside mirror assembly 14 is connected to an end of a tab-like lug 50 (FIG. 15) which is perpendicular to shaft 33. Lug 50 extends laterally from the exterior of a detent drum 51. The plane of lug 50 is parallel to and preferably includes the axis of drum 51. A hole 52 can extend axially through drum 51 and is sized to receive stub shafts 46. The length of drum 51 is slightly less than the distance between arms 45. Thus, in the assembled accessory, drum 51 is rotatably carried on the stub shafts of hinge base 22. The exterior of the drum is longitudinally cylindrically fluted between spaced longitudinal detent projections 53 to mate with the contour of detent projection 47. Accordingly, when the hinge base 22 and hinge post 23 are coupled together by coaction of stub shafts 46 in the drum center hole 52, the drum has a number of stable detented positions relative to the hinge base by action of projection 47 in the drum's external longitudinal flute recesses. One of those positions defines the closed state of the accessory. Other stable positions can be angularly displaced from the closed state by angles of 45°, 90°, 135° and 180°, and even 225° if desired.

Base member 22 of hinge mechanism 16 preferably is affixed to coupling ring 15 by embedding element 44 of base member 22 into the material of the ring in the course of fabrication of the ring as by a molding process. The ring material preferably is a relatively soft elastomeric material which is deformable. More preferably, the material of ring 15 is an ethylene-propylene-diene monomer thermoplastic elastomer having a cured hardness of 60 or so on the Shore A scale. The ring preferably is provided in the form of a cylindrical sleeve 55 having a radially inwardly extending circumferential flange 56 at one end. The radial extent of the flange is limited, as the purpose of the flange is to provide a stop regulating the distance the sleeve can be slid axially along the exterior of the lens end of a flashlight of selected design or manufacture; see FIG. 1. A range of models or styles of accessory 10 (the principal difference between them being the inner diameters of sleeves 55) can be made available for use with flashlights having differing lens end outer diameters.

Except for mirror element 17, the preferred color for the components of accessory 10 is black. The preferred material for mirror housing 18, frame 19, and the mirror element is ABS resin. The mirror element material preferably is transparent and is metallized on its inner surface. The preferred material for hinge base 22 and hinge post 23 is nylon 6/6 with 30 percent glass filler. All accessory components preferably are molded. Use of mirror accessory 10 is convenient. The accessory is compact when disposed in its folded storage state (FIGS. 2 and 3) for storage. A presently preferred form of the accessory has a height (FIG. 2) of under 3.5 inches, a thickness (FIG. 2) under 1.25 inches, and a width (FIG. 3) of 3⅛ inches. As so sized, the accessory is readily carriable by a police officer. In the event of a need to look under something such as an automotive vehicle, or over or around an obstruction or other structure, or to inspect things on an elevated shelf, among other usage situations, the accessory is readily mounted to the lens or front end of a flashlight of selected design which the accessory is defined to fit. The accessory is opened from its folded state so that coupling ring 15 can be slid snugly over the exterior of the lens end of a flashlight for which the ring 15 is sized to accommodate. The desired position and orientation of mirror 20 relative to the body of the flashlight can be established quickly by movement of the mirror about either or both of hinge axis 25 and swivel axis 26. The flashlight is used as an extension of the officer's arm to place the mirror where needed without exposing the officer to hazard.

Figures 2, 3:
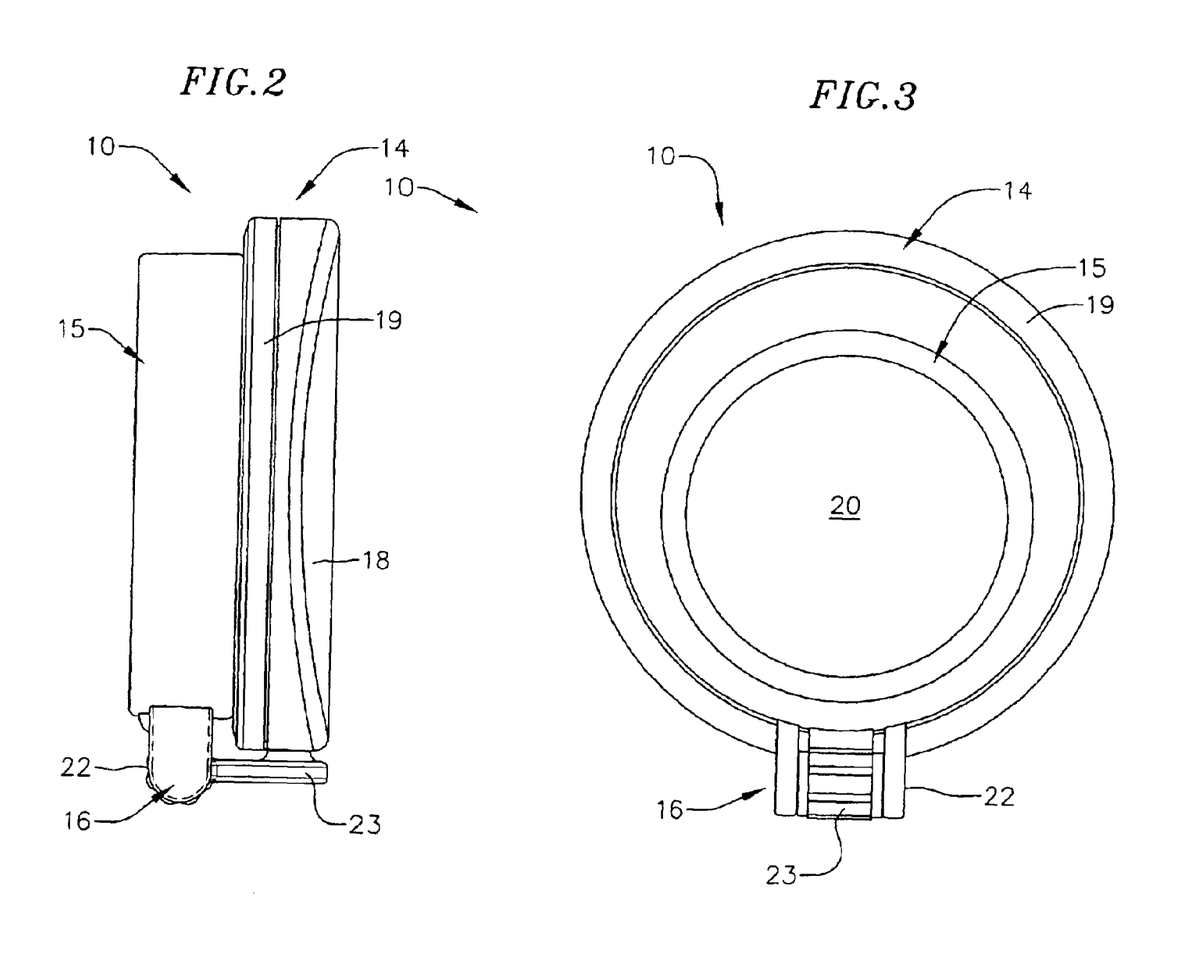
FIG. 2 is a side elevation view of the mirror accessory in a closed state for storage.
FIG. 3 is a rear elevation view of the closed mirror accessory.
Figure 4:
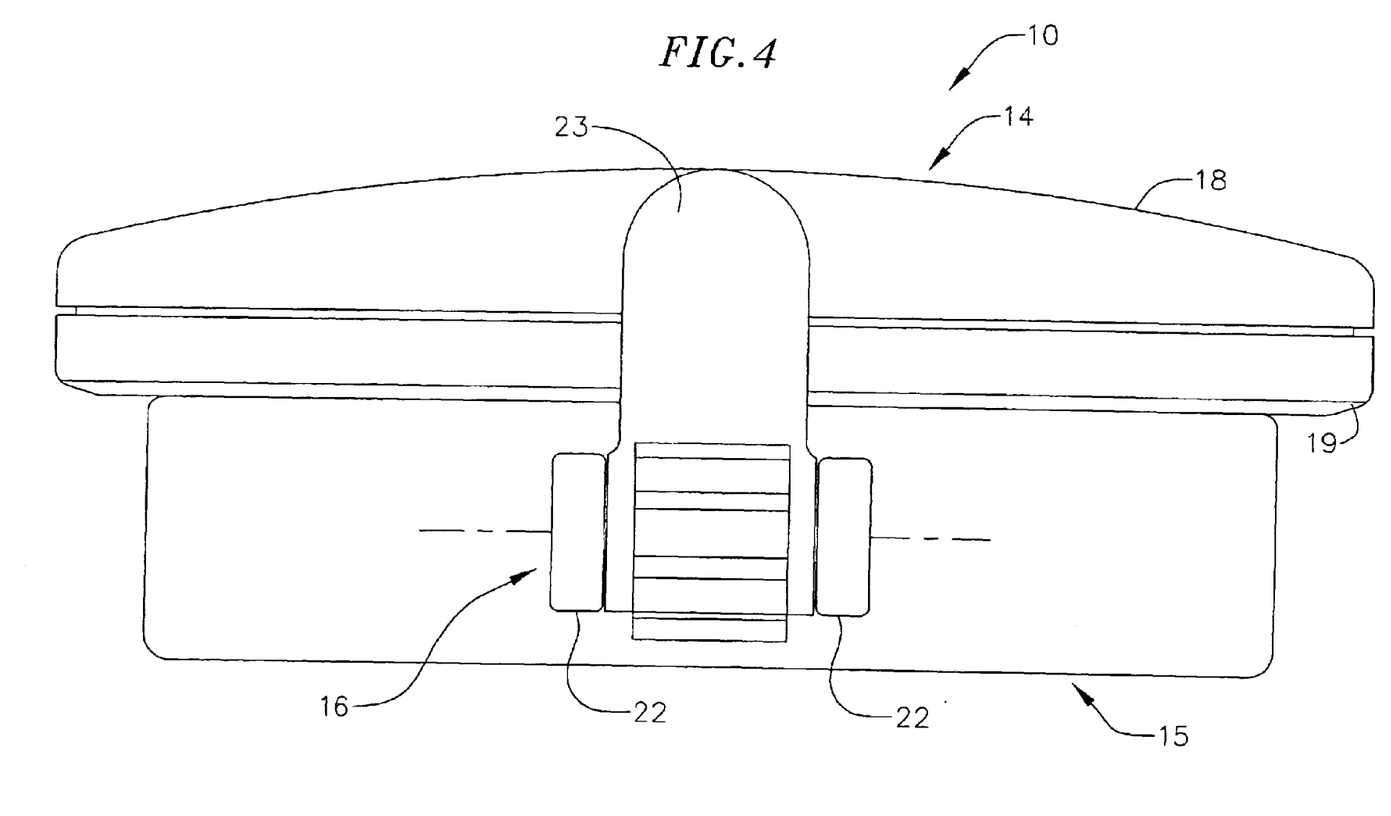
FIG. 4 is a bottom plan view of the closed accessory.

The storage state of the accessory is as shown in FIGS. 2 and 3. In that state, the mirror assembly 14 lies parallel to and adjacent to, preferably, the rear or unflanged end of the coupling ring sleeve, and mirror surface 20 faces toward the coupling ring. That relation is one of the stable positions of hinge mechanism 16 as afforded by the coaction of hinge detent projections 47 and 53. Mirror surface 20 thus is protected by the coupling ring from being scratched, marred or dirtied when not in use.

While police officers are the persons for whom the mirror accessory initially was developed, the accessory can be used to advantage by anyone having a need to view things in inaccessible or inconvenient places. Also, because the presence of the accessory on a flashlight does not interfere with the ability of the flashlight to cast a beam of light, the accessory can be used to view things or areas illuminated by the flashlight, especially areas to which physical access by the user is difficult or impossible.

It is within the scope of this invention that the coupling ring of the accessory can be sized and configured to be engaged around the ends of articles other than flashlights. Such other articles can include police batons, poles, and the like.

The foregoing description focuses upon a presently preferred structural arrangement which embodies the invention. That description is not intended to be, nor should it be interpreted to be an exhaustive catalog of all forms in which the invention can be embodied. Modifications and variations of the arrangements described, yet within the fair scope of the invention, may occur to persons skilled in the fields to which the invention pertains.

What is claimed is:

1. A mirror accessory for a flashlight having a lens end, the accessory comprising:

a mounting member sized and configured for snug removable engagement around at least a portion of the exterior circumference of the lens end of a flashlight of selected design, a mirror member including a mirror surface, and a hinge structure connected between the mounting and mirror members and defined to afford movement of the mirror member relative to the mounting member between a storage position in which the members are in overlying relation and a usage position angularly displaced from the storage position and in which the hinge structure defines a hinge axis fixed relative to the mounting member about which the mirror member is movable toward and away from its storage position, the hinge structure also defining a swivel axis perpendicular to the hinge axis and located between the hinge axis and the mirror member, the mirror member being angularly movable about the swivel axis.

2. The mirror accessory according to claim 1 in which the mounting member is annular.

3. The mirror accessory according to claim 2 in which the mounting member is defined in substantial part of a deformable elastomeric material.

4. The mirror accessory according to claim 3 in which the mounting member comprises a sleeve having an inner diameter dimensioned cooperatively with respect to the lens end of a selected flashlight.

5. The mirror accessory according to claim 4 including a radially inwardly extending flange circumferentially of the sleeve at one end of the sleeve.

6. The mirror accessory according to claim 1 in which the hinge structure includes detents defining plural stable positions of the mirror member angularly relative to the mounting member, one of the stable positions corresponding to the storage position of the member, another of the stable positions corresponding to said usage position.

7. The mirror assembly according to claim 6 in which the detents provide at least one additional stable position of the mirror member relative to the mounting member between the storage position and said usage position.

8. The mirror accessory according to claim 1 including detents cooperating between the mirror member and structure defining the swivel axis, the detents defining a plurality of stable positions of the mirror member angularly about the swivel axis.

9. The mirror accessory according to claim 1 in which the mirror surface is substantially spherically convexly curved.

10. The mirror accessory according to claim 1 in which, in the storage position of the mirror member, the mirror surface is disposable toward the mounting member.

11. A mirror accessory for a flashlight having a lens end, the accessory comprising:

a mounting member sized and configured for removable stable engagement with the exterior of the lens end of a flashlight of selected design, a mirror member including a mirror surface, and a hinge structure connected between the mounting and mirror members, the hinge structure having first and second leaves connected for angular relative movement about a hinge axis, the first leaf being affixed to the mounting member, the second leaf defining a swivel axis perpendicular to the hinge axis, the mirror member being connected to the second leaf for angular movement about the swivel axis.

12. The mirror accessory according to claim 11 in which the mounting member is annular and the mirror member has a storage position in which the mirror member overlies the mounting member.

13. The mirror accessory according to claim 12 in which the mirror surface is disposable to face toward the mounting member in the storage position of the mirror member relative to the mounting member.

14. The mirror accessory according to claim 11 including detents cooperating between the hinge structure leaves defining plural spaced stable angular relations between the leaves about the hinge axis.

15. The mirror accessory according to claim 11 including detents cooperating between the mirror member and the second leaf defining plural spaced stable angular relations between the mirror member and the second leaf about the swivel axis.

16. The mirror accessory according to claim 11 in which the mounting member is comprised of a deformable elastomeric material, and a portion of the first leaf of the hinge structure is embedded in that material.

17. The mirror accessory according to claim 11 in which the mirror member is carried in a housing, the second leaf of the hinge structure includes a shaft extending into the housing, defining the swivel axis, and being only angularly movable relative to the housing.

18. The mirror accessory according to claim 17 including detents cooperating between the shaft and the housing and defining plural spaced stable angular relations of the housing relative to the shaft.

* * * * *